Jan. 20, 1959 J. MEDOW 2,869,960

ELECTRONIC CHASSIS LOCKING ASSEMBLY

Filed Nov. 29, 1957

2 Sheets-Sheet 1

INVENTOR.
Jules Medow
BY [signature]
ATTORNEY.

ELECTRONIC CHASSIS LOCKING ASSEMBLY

Filed Nov. 29, 1957 2 Sheets-Sheet 2

INVENTOR.
Jules Medow
BY V. R. Goshaw
ATTORNEY.

United States Patent Office 2,869,960

Patented Jan. 20, 1959

2,869,960

ELECTRONIC CHASSIS LOCKING ASSEMBLY

Jules Medow, Los Angeles, Calif., assignor, by mesne assignments, to the United States of America as represented by the Secretary of the Air Force Application November 29, 1957, Serial No. 699,717

8 Claims. (Cl. 312—333)

This invention relates to electrical unit assembly constructions, and particularly to an assembly construction which combines one or a plurality of electrical chassis supporting electrical components with a unitary frame.

It is well known that in the construction of electrical equipment, the smaller electrical components, such as tubes, resistors, condensers, coils, etc., are assembled on chassis to provide amplifiers, oscillators, and similar units. These electrical units may then be assembled in frames for attachment to racks or other mounting means. The present invention is directed to a construction which permits the rapid assembly of one or a plurality of electrical chassis, each chassis being firmly supported and held in position with respect to the others or with respect to their mounting. The final assembly is of the type which is particularly suitable for use in air-borne or missile equipment wherein vibration is encountered. Each electrical chassis includes a mounting plate on which the components are attached, the plate being inserted into one of several compartments of a decked frame so that the tightening of a nut will apply holding pressure along the entire length of the plate. One end of the chassis may terminate in a connecting plug, male or female, which will interconnect with other units of an electrical system.

The principal object of the invention, therefore, is to facilitate the mounting of one or a plurality of electrical chassis into a single assembly.

Another object of the invention is to provide an improved mounting for one or a plurality of electrical chassis.

A further object of the invention is to provide an improved mounting structure for assembling one or a plurality of electrical chassis into an integral unit in which each chassis is supported and locked over the entire length of its mounting plate.

A better understanding of this invention may be had from the following detailed description when read in connection with the accompanying drawings, in which.

Figure 5:
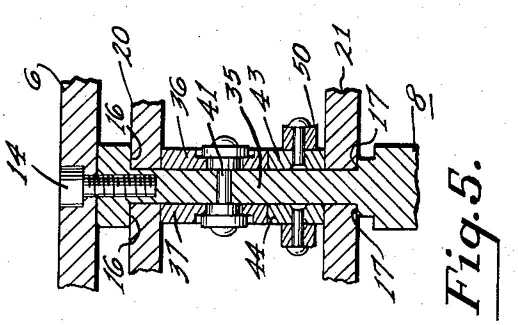
Fig. 5 is a cross-sectional view taken along the line 5—5 of Fig. 3.
Figure 4:
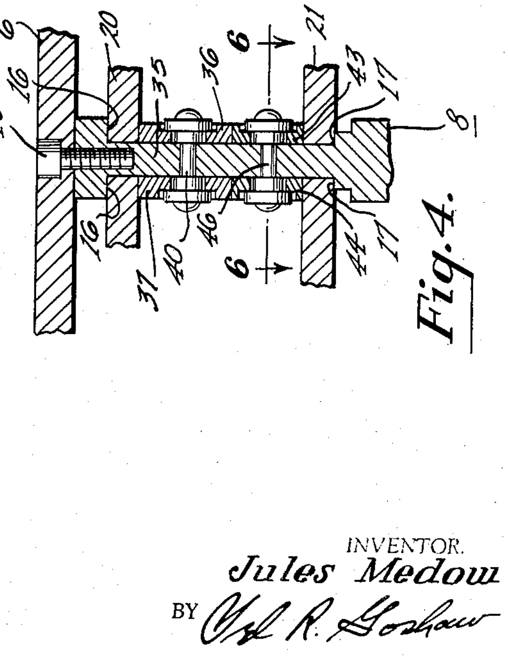
Fig. 4 is a cross-sectional view taken along the line 4—4 of Fig. 3.

Referring, now, to the drawings in which the same reference numerals identify the same elements, a plurality of electrical chassis 5 (the ends of twelve chassis being shown in Fig. 1 and a side view of two chassis being shown in Fig. 2) are mounted in a frame having an upper plate 6 and a lower plate 7, these plates being square or rectangular, depending upon the length and number of chassis 5 to be mounted. The two plates 6 and 7 are separated by intermediate partitions 8 and end panels 10 and 11, the end panels being one-half of a partition. The partitions and panels extend the entire width or length of the plates 6 and 7 and are attached to the plates by screws such as shown at 13 and 14 in Figs. 4 and 5, respectively. The partitions 8 have upper shoulders 16 and lower shoulders 17 and are symmetrical about a vertical center line.

Figure 2:
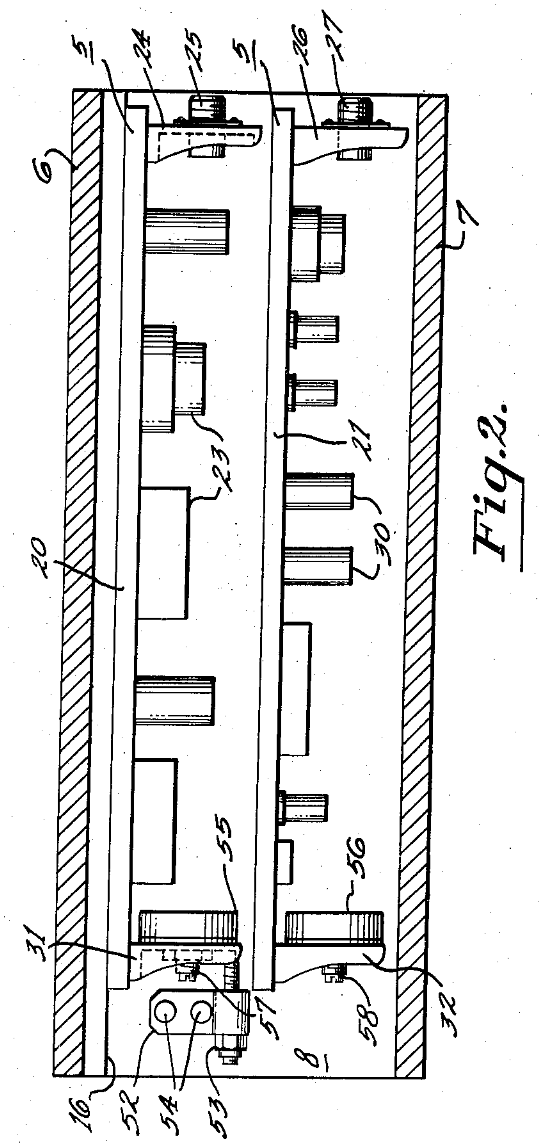
Fig. 2 is a side view, partly in section, showing the electrical components of two chassis and their positioning with respect to one another.

The electrical chassis to be assembled are mounted on plates, two plates 20 and 21 being shown in Fig. 2. Plates 20 and 21 have condensers, transformers, resistors, and other electrical components, such as shown at 23 and 30, mounted thereon in any suitable manner. On brackets 24 and 26 at one end of each of the respective plates 20 and 21 are connecting plugs 25 and 27. The chassis 5 all have similar elements mounted on their respective plates, the elements used depending on the function of the chassis. The other end of the plates 20 and 21 have respective brackets 31 and 32 attached thereto. As shown in Fig. 2, the brackets 31 and 32 support potentiometers 55 and 56 which may be adjusted by screws 57 and 58, respectively, the screws being accessible from the front of the assembly.

Again referring to the partitions 8 and panels 10 and 11, mounted on each side of the upper portion of the web sections 35 of each partition and on one side of the panel webs are comparatively fixed, tapered runners, two being shown at 36 and 37, while a similar single runner is mounted on the end panels 10 and 11. The runners 36 and 37 are held on the web 35 by double-headed bolts and washer combinations 40 and 41, it being noted in Figs. 4 and 5 that the holes in the tapered runners 36 and 37 are larger than the bolts so that the runners may be moved transversely of the chassis a predetermined amount.

Figure 1:
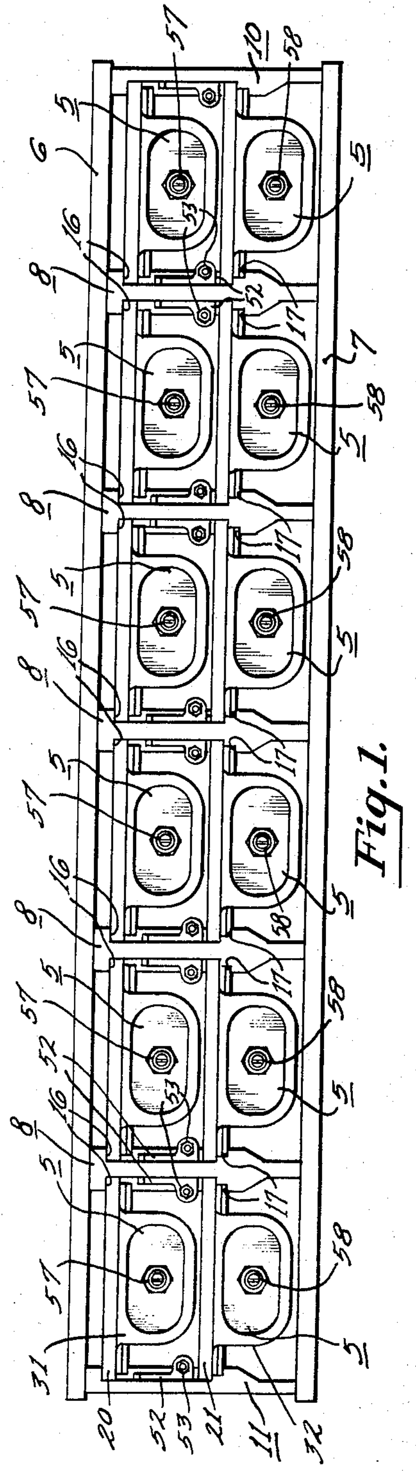
Fig. 1 is an end view of the chassis assembly showing the ends of a plurality of chassis units.
Figure 3:
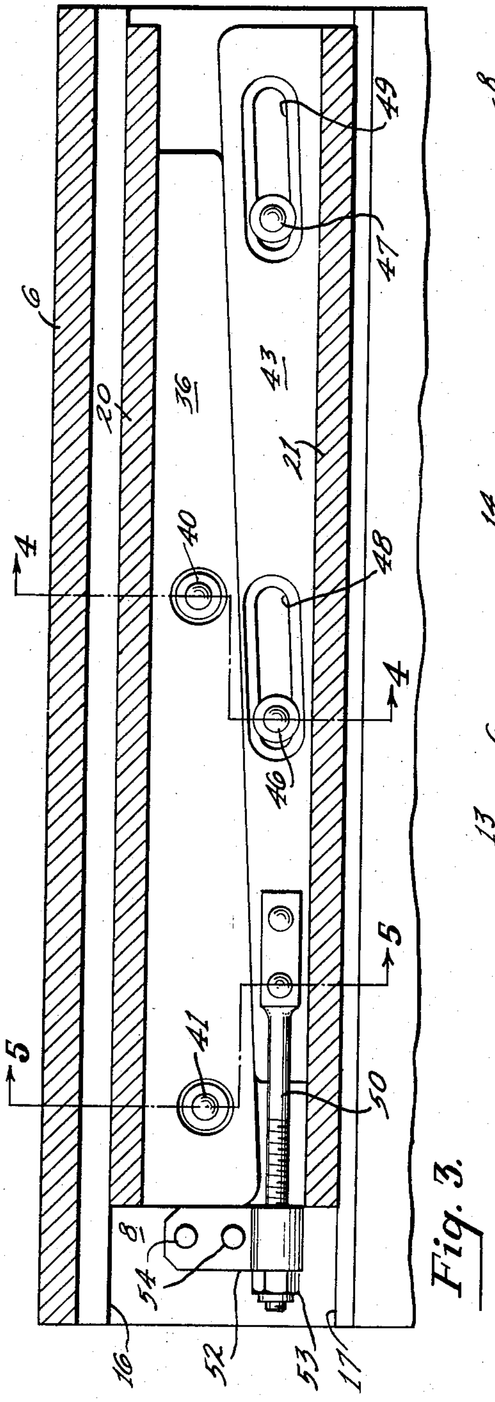
Fig. 3 is a cross-sectional view showing the binding unit which maintains the chassis in position in the assembly.
Figure 6:
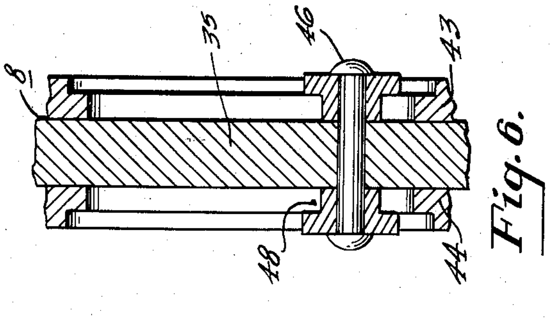
Fig. 6 is a cross-sectional view taken along the line 6—6 of Fig. 4.

Also mounted on the webs of the partitions and panels are adjustable tapered runners such as shown at 43 and 44, a single runner being mounted on the end panels 10 and 11. The runners 43 and 44 are held on the web 35 by double-headed bolts 46 and 47, the bolts being in respective elongated slots 48 and 49 in the tapered runners. Fixedly attached to the tapered runners 43 and 44 is threaded rods, one of which is shown at 50 in Fig. 3, the rods passing through the eye of a bracket 52 attached to the webs by bolts as shown at 54, the rods having nuts such as shown at 53 on the ends thereof. An end view of the nuts 53 is shown in Fig. 1.

Without the units 5 therein, the frame is made up of the plates 6 and 7, intermediate partitions 8, end panels 10 and 11, the partitions having the tapered runners and rods thereon as just described. To mount the units 5 in the frame, it is only necessary to slide the upper chassis plates, such as 20, on the upper edges of two opposed, comparatively fixed runners. The chassis plates are thus positioned under the shoulders 16. The plates 21 of the lower units are slid into the frame, the edges of the plates being positioned between the shoulders 17 and the lower edges of oppositely tapered runners such as 43 and 44. The nuts 53 are then turned, which will move the lower runners, such as 43 and 44, to the left (see Fig. 3), thus moving the upper runners, such as 36 and 37, upwardly against the chassis plates. In other words, the transverse distance between the upper edges of runners such as 36 and 37 and the lower edges of runners such as 43 and 44 is increased by movement of the runners 43 and 44 to the left in Fig. 3. In this manner, pressure is applied over substantially the entire length of the mounting plates of each chassis and a particularly firm mounting is obtained.

This type of mounting is not only economical and will permit rapid assembly of many electrical chassis but will hold the chassis sufficiently firm to withstand air-borne shocks and vibrations. It is particularly suitable for missiles where high speeds are encountered. Although a plurality of chassis has been illustrated and described, it is to be understood that a single chassis may be similarly mounted in a frame or shell. In this event, the upper runners 36 and 37 may be rigidly mounted.

I claim:

1. An assembly for an electrical chassis comprising a pair of parallel plates, interconnecting partitions between said plates, said partitions being symmetrical about a center line and having upper shoulder portions and lower shoulder portions, a pair of elongated tapered runners mounted on said partitions, one of said tapered runners being movable transversely and the other of said runners being movable longitudinally, means for moving said longitudinally movable runner longitudinally with respect to said transversely movable tapered runner, and a mounting plate for said chassis, said chassis mounting plate being positioned between said tapered runners and certain of said shoulder portions of said partitions.

2. An assembly in accordance with claim 1 in which an addiitonal chassis is provided, said additional chassis having a mounting plate positioned between said tapered runners and other of said shoulder portions.

3. An assembly in accordance with claim 1 in which said means for moving said longitudinally movable runner longitudinally includes a threaded rod, a bracket mounted on said partitions through which said threaded portion of said rod extends, and nuts in contact with said bracket and threaded on said rod.

4. An assembly in accordance with claim 1 in which panels are provided at the ends of said plates, said panels having elongated tapered runners mounted thereon.

5. An assembly construction comprising a frame having parallel plates spaced apart, a plurality of parallel partitions between said plates spaced apart and attached to said plates, said partitions having upper and lower shoulder portions, a first tapered runner mounted on each side of each of said partitions, said first tapered runner being movable transversely, and a second tapered runner mounted on each side of each of said partitions and having one edge in contact with one edge of said first runner, said second tapered runner being movable longitudinally with respect to said first runner.

6. An assembly construction in accordance with claim 5 in which a threaded rod is attached to said second tapered runner, means being provided at the end of said partitions for moving said rod longitudinally.

7. An assembly construction in accordance with claim 5 in which a chassis having a mounting plate is provided, the edges of said mounting plate being positioned between said upper shoulder portions on adjacent partitions and between the edges of two of said runners on adjacent partitions.

8. An assembly construction in accordance with claim 7 in which a second chassis having a mounting plate is provided, the edges of said mounting plate of said second chassis being positioned between said lower shoulder portions of the same adjacent partitions holding said first chassis and the edges of the other runners on said same adjacent partitions.

References Cited in the file of this patent

UNITED STATES PATENTS

| | | |
|---|---|---|
| 1,649,212 | Borchard | Nov. 15, 1927 |
| 2,227,712 | Hackley | Jan. 7, 1941 |
| 2,577,396 | Assmundsson | Dec. 4, 1951 |